C. J. BEAVER AND E. A. CLAREMONT.
SHEATH COUPLING FOR ELECTRIC CABLES.
APPLICATION FILED OCT. 30, 1918.

1,308,389.

Patented July 1, 1919.

Inventors:
Charles James Beaver
Ernest Alexander Claremont
by their Attorney, R. Hadden

UNITED STATES PATENT OFFICE.

CHARLES JAMES BEAVER, OF HALE, AND ERNEST ALEXANDER CLAREMONT, OF HIGH LEGH, ENGLAND.

SHEATH-COUPLING FOR ELECTRIC CABLES.

1,308,389.      Specification of Letters Patent.      Patented July 1, 1919.

Application filed October 30, 1918. Serial No. 260,397.

*To all whom it may concern:*

Be it known that we, CHARLES JAMES BEAVER, of Hale, Cheshire, England, and ERNEST ALEXANDER CLAREMONT, of High Legh, Cheshire, England, subjects of the King of Great Britain and Ireland, have invented certain new and useful Improvements in Sheath-Couplings for Electric Cables, of which the following is a specification.

This invention relates to lead jointing couplers or junction boxes for containing the joints of sections of electric cables in high tension systems and which are plumbed or otherwise electrically connected to the lead covering, such as for example jointing sleeves consisting of three parts, that is to say, a central member which in cross section is for the greater part of its length of the shape of a pear with the thin end cut off short and at each end gradually assuming the circular shape and having in the flat side formed by the truncated end of the "pear" a long rectangular opening provided with a removable cover and two end members circular in cross section which join on to the ends of the central members and taper off to the size of the cable sections to be jointed. Such a lead junction box is the subject matter of and is fully described in the specification filed in connection with British Letters Patent No. 6093, A. D. 1915.

The object of the present invention is to render such a jointing sleeve suitable or more applicable in cases where the cable is furnished with a subsidiary conductor surrounding the main conductor or conductors for either protective or detective purposes, or for both, such as for example in the manner described in the specification of the pending application for Letters Patent dated September 25, 1918, Serial No. 255,623.

Such a subsidiary conductor is hereinafter referred to as the "test" conductor.

In all cases of joints of sections of cable containing a test conductor, it is necessary to bridge across the joint with an insulated conductor connected to the test conductor of the sections on each side of the joint in order to preserve the electrical continuity of the test conductor.

When the test conductor is used on extra high tension cables in conjunction with detective and protective devices, it is important that the said bridging conductor should, firstly, completely envelop the joint, so that its functions with regard to the said joint are similar to those of the test conductor with regard to the conductors throughout the cable: secondly, it should preserve freedom from concentrated stresses due to interior projections or edges, and have advantages as regards efficient filling similar to that attained by the form of jointing sleeves above referred to, and thirdly, it should be insulated from such jointing sleeve.

According to the present invention, we construct a thin metal conductor substantially similar in shape to the jointing sleeve or junction box, but of smaller dimensions, and so shaped that it completely surrounds and envelops the whole of the joint and operates as a continuation across the joint of the test conductor surrounding the cable, and with said thin metal conductor we connect the test conductor of the two sections of the cable, and in building up the joint, arrange the same within and concentrically with the said jointing sleeve or junction box. This thin metal conductor may be of light spun metal, subsequently pressed or planished to the required shape, and it may be made with similar apertures to those provided in the jointing sleeve above described, namely, a rectangular or elliptical opening at the top, into which the cover is fitted, and holes near the ends to facilitate filling with compound. As it will have no mechanical functions, it may be made more efficient as regards freedom from edges and projections than the jointing sleeve itself, in that it may be made in one piece without transverse joints.

The said thin metal conductor may be connected at its ends to the test conductor by any suitable means, for example, by soldering to a metal ring fitting slipped over the test conductor, the copper tape of the latter being first turned back and soldered into a recess in the said ring. The said thin metal conductor may, if necessary, be definitely spaced from the jointing sleeve by bridges of insulating material, such as porcelain.

It will be apparent that the said thin metal conductor may serve as an electrostatic shield in that it may form a smooth and uninterrupted lining to the jointing sleeve and it may be used for this purpose alone if desired, the ends in such case (when the cable does not contain a test conductor) being connected to the lead covering of the cable.

An embodiment of the invention is represented in the annexed drawings, wherein:—

In all the drawings, like characters indicate similar parts.

Figure 1:
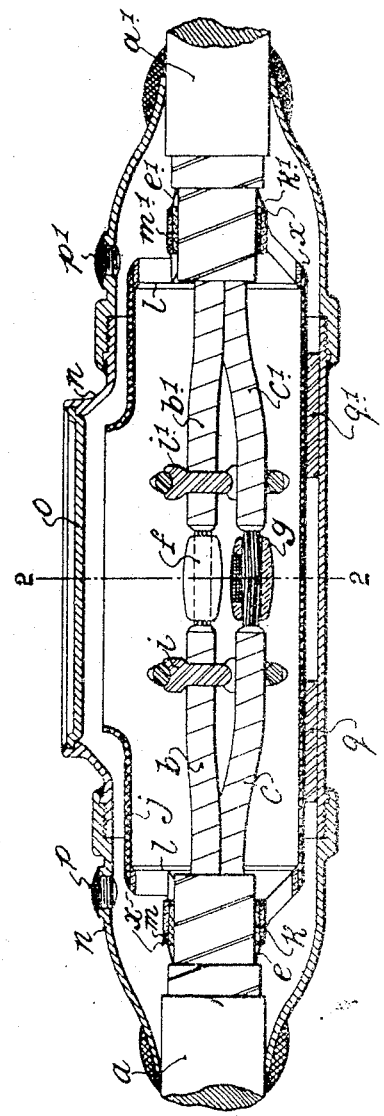
Figure 1 is a sectional elevation of a joint between two sections of a high pressure three-core cable in which a test conductor is embodied and bridged over the joint by means of a thin metal conductor, as above described.
Figure 2:
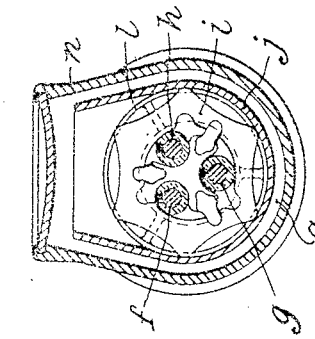
Fig. 2 is a cross section on the line 2—2 of Fig. 1.
Figure 3:
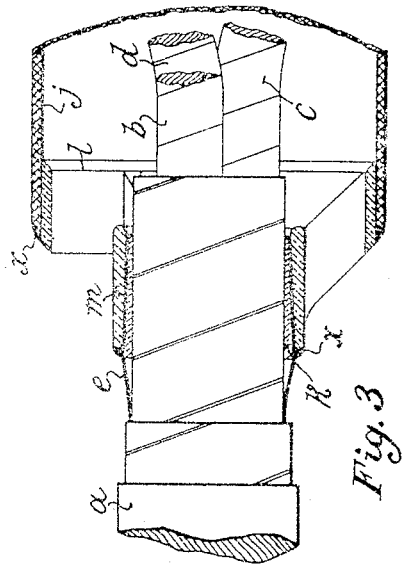
Fig. 3 is a detailed drawing on a larger scale of one end of the test conductor joint.

$a$ and $a^1$ are the ends of two sections of a lead-covered cable which are to be jointed together, having insulated cores $b$, $c$, $d$, and $b^1$, $c^1$, $d^1$, respectively, and test conductors $e$ and $e^1$.

$f$, $g$, $h$ are joints in the main conductors.

$i$ and $i^1$ are separators of porcelain or other suitable insulating material, and $j$ is the thin metal conductor coupling the two test conductors $e$ and $e^1$, and having a rectangular or elliptical opening at the top with open cylindrical ends.

$k$ and $k^1$ are metal rings to which the test conductors $e$ and $e^1$ are connected, and $l$ and $l^1$ are pulley shaped rings, the bosses or hubs $m$ and $m^1$ of which receive and make contact with the test conductors $e$ and $e^1$, and the peripheries of said rings fit into and make contact with the thin metal conductor $j$. The said contacts may be rendered permanent by soldering as indicated at parts marked $x$.

$n$ is the main jointing sleeve or junction box, of which $o$ is the cover and $p$ and $p^1$ the vent plugs, and $q$ and $q^1$ are shaped pieces of insulating material separating the thin metal conductor $j$ from said jointing sleeve $n$.

What we claim as our invention and desire to secure by Letters Patent of the United States is:—

1. In a coupler between sections of a lead covered electric cable containing a subsidiary conductor for detective and or protective purposes, in which the joint is inclosed in a metal box or sleeve plumbed or otherwise electrically connected to the lead covering, the combination of a thin metal conductor substantially similar in shape to the said box or sleeve, but of smaller dimensions, and so shaped as to completely surround and envelop the joint and operate as a continuation of the subsidiary conductor across the joint, said metal conductor being connected to the subsidiary conductor of each section of cable an insulated from the main conductor or conductors and from the said box or sleeve.

2. In a coupler for a lead covered electric cable in which the joint is inclosed in a metal box or sleeve consisting of three parts, viz: a central member which in cross section is for the greater part of its length the shape of a pear with the thin end cut off short, and at each end gradually assumes the circular shape, and having in a flat side formed by the truncated end of the "pear" a long rectangular opening provided with a removable cover and two end members circular in cross section, which join on to the ends of the central member and taper off to the size of the cable sections of which are to be jointed, and which is plumbed or otherwise electrically connected to the lead covering, the combination of a thin metal conductor substantially similar in shape to the said box or sleeve, but of smaller dimensions, said latter conductor being connected at each end to a conductor in the cable, but otherwise at a distance from the said sleeve, and insulated from the main conductor or conductors.

In witness whereof we have signed this specification in the presence of two witnesses.

CHARLES JAMES BEAVER.
ERNEST ALEXANDER CLAREMONT.

Witnesses:
C. A. NEALE,
E. B. JOULE.